April 6, 1971 E. J. RICE 3,574,008

MUSHROOM EPITAXIAL GROWTH IN TIER-TYPE SHAPED HOLES

Filed Aug. 19, 1968 4 Sheets-Sheet 1

EDWARD J. RICE
INVENTOR.

BY Spensley & Horn
ATTORNEYS

MUSHROOM EPITAXIAL GROWTH IN TIER-TYPE SHAPED HOLES

Filed Aug. 19, 1968 4 Sheets-Sheet 2

EDWARD J. RICE
INVENTOR.

BY Spensley & Horn

ATTORNEYS

EDWARD J. RICE
INVENTOR.

BY Spensley & Horn
ATTORNEYS

MUSHROOM EPITAXIAL GROWTH IN TIER-TYPE SHAPED HOLES

Filed Aug. 19, 1968 4 Sheets-Sheet 4

EDWARD J. RICE
INVENTOR.
BY Spensley & Horn
ATTORNEYS

United States Patent Office 3,574,008

Patented Apr. 6, 1971

3,574,008

MUSHROOM EPITAXIAL GROWTH IN TIER-TYPE SHAPED HOLES

Edward J. Rice, Los Angeles, Calif., assignor to TRW Semiconductors, Inc., Lawndale, Calif.

Filed Aug. 19, 1968, Ser. No. 753,643
Int. Cl. H01l 7/36, 5/00
U.S. Cl. 148—175 15 Claims

ABSTRACT OF THE DISCLOSURE

A structure formed by, and a process for growing epitaxial layers of silicon on an exposed surface of a silicon wafer through openings in a passivating structure having a predetermined "tier-type" configuration. The devices formed by this method have improved breakdown voltage characteristics. Further, the method makes possible the ability to vary and control junction capacitance as required.

BACKGROUND OF THE INVENTION

(I) Field of the invention

The invention relates generally to the manufacture of semiconductor devices and more specifically to the manufacture of diodes, transistors and variactors.

(II) Description of the prior art

The prior art teaches various methods for growing epitaxial layers and for attempting to provide better electrical characteristics for the single crystal junctions formed. Some of the previous techniques may be found in U.S. Pats. 3,206,339, 3,234,058 and 3,265,542.

However, none of the prior art methods have been able to provide devices which have uniform cross sections in the regions immediately adjacent to the masks. Further, none of the prior art methods has provided a successful scheme for controlling and modifying capacitance characteristics, increasing current handling capacity and increasing breakdown voltages.

SUMMARY OF THE INVENTION

In one of its broadest aspects, the present invention provides a method of growing a crystal of semiconductive material epitaxially. A wafer of substrate material of a given conductivity type is provided. A passivating layer is then imposed upon the surface of the substrate wafer. Openings are etched in the passivating layer to expose the substrate layer, the openings having width dimensions varying from the bottom of the opening to the upper end thereof. The dimensions at the bottom of the openings are generally smaller than those at the upper end. A crystal of semiconductive material is grown epitaxially on the exposed substrate surface within the openings etched in the passivating layers. The crystals of semiconductive materials are grown until they overflow the openings onto the passivating layer and take on the appearance of mushrooms. The crystals are then lapped until the required surface condition is obtained.

Epitaxial growth on the exposed substrate surface within the openings in the passivating layers may be provided by known methods. For example, the epitaxial growth of silicon may be achieved by vapor deposition of silicon involving the hydrogen reduction of silicon tetrachloride and silicon halide with any desired impurity elements being added during the deposition by the simultaneous hydrogen reduction of the halide to control the resistivity and conductivity type of the grown silicon.

The epitaxial growth occurs only within the geometrically defined openings in the passivating layer, which openings can be defined with great precision and which are semi-isolated from the surrounding regions by the oxide layers. As a result, the growth is uniformly defined in the openings and the subsequent lapping operation leaves semi-isolated single crystal silicon islands that can be used for transistor or diode fabrication using standard techniques. By modifying the structure of the openings the capacitance voltage characteristics of the devices can be controlled. Also the resistivity of the silicon growth may be varied to further modify the capacitance properties. Current handling capability may be increased by decreasing the resistivity of the deposited silicon and I predict that by reducing parasitic capacitance and increasing the breakdown voltage (for a given resistivity material) the cut-off frequency of a transistor will naturally be increased. These advances are particularly significant for high frequency transistors and for specialized capacitance voltage devices such as variactors. A significant advantage of the present invention is that the mushroom configuration of the epitaxially grown silicon upon a silicon substrate provides a small junction area which significantly lowers the capacitance of the device. The base-collector junction capacitance may be tailored or reduced to whatever value is desired. Further the disclosed structure has increased the reverse voltage breakdown properties of the devices by eliminating the curvature at the edges of a diffused junction.

It is an object of the present invention to provide a method and device which has uniform cross section throughout the epitaxial layer.

It is another object of the present invention to provide a method which will allow the reduction of collector capacitance, improve the current handling capability and raise the cut-off frequency transistors.

It is yet another object of the present invention to provide a method which will allow the control of the capacitance voltage characteristics of a semiconductor device.

It is still another object of the present invention to increase the breakdown voltage of a semiconductor junction by providing a diffused junction having no curved edges or corners.

The novel features which are believed to be characteristic of the invention, both as to its organization and method of operation, together with further objects and advantages thereof will be better understood from the following description considered in connection with the accompanying drawings in which some preferred embodiments of the invention are illustrated by way of example. It is to be expressly understood, however, that the drawings are for the purpose of illustration and description only, and are not intended as a definition of the limits of the invention.

DESCRIPTION OF THE PREFERRED EMBODIMENTS

The invention will now be described by way of example with respect to the formation of a transistor device utilizing an N+ type substrate and epitaxially growing N type silicon crystals thereon. It will be understood that the method can also be utilized to epitaxially grow a crystal of a semiconductive material of one conductivity type upon a substrate of a different conductivity type as will be later described. The several figures are not necessarily to scale; however, like parts are designated by like numerals.

Figure 1A:
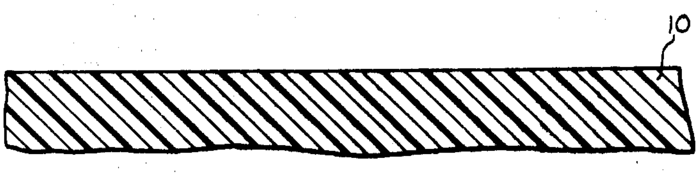
FIG. 1*a* is a diagrammatic representation of a substrate layer of semiconductive material.
Figure 1B:
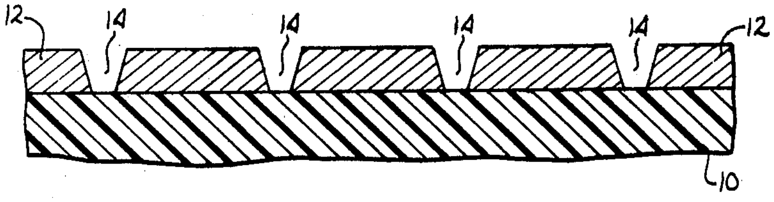
FIG. 1*b* is a diagrammatic representation of a substrate with a passivating layer having openings therein.

Referring to FIG. 1*a*, starting material may be wafer 10 of silicon, in this case of N+ conductivity having a resistivity of about .01 ohm-centimeter and a crystal orientation of about 2° from the 1, 1, 1, crystal orientation. The exact size and shape of the silicon wafer is not important and may be selected to provide sufficient area to permit the formation thereupon of the desired number of circuit elements. Typically, the wafer may be about 1¼" in diameter and mechanically lapped to a thickness of about 10 mils and then polished. The crystal may then be chemically etched to clean the surface of the wafer and to remove any damage produced on the crystal surfaces by the preceding lapping and polishing. Referring now to FIG. 1*b*, a passivating layer 12 is imposed on the surface of the wafer 10. The passivating layer may be formed by the utilization of ethyl silicate or silicon dioxide or other known materials. Oxide thicknesses in the order of 9 microns may be obtained without cracking. In the embodiments described, the passivating layer will be silicon dioxide. The silicon dioxide layer may be formed by several known methods such as chemical depositions or by thermal growth, the former being the preferred method. This technique is well known in the art and does not form a part of the invention. Typically, the prepared silicon wafer is maintained at about 700° in a flow of ortho ethyl silicate. Normally about 1 micron is deposited and then a densifying operation takes place at about 900° C. The operation is repeated until the desired thickness is obtained.

Next a series of openings 14 are etched in the passivating layer. These openings are etched all the way through layer 12 until the surface of wafer 10 is exposed. The openings are etched according to a predetermined pattern in which elements are to be spaced and/or at which electrical contacts are to be made. The opening 14 may be formed by known photolithographic techniques which do not form a part of the present invention. For example, the upper surface of wafer 10 bearing the silicon dioxide layer 12 may be covered with a conventional photographic resist which is then exposed in those areas in which the oxide layer is to remain. The photoresist layer is then rinsed in a suitable developer which removes the portions of the resist which are not exposed. The resultant assembly is then immersed in an etching solution which dissolves silicon dioxide in the regions exposed. Note that the openings 14 preferably have a frusto-conical configuration, although other shapes could be used.

Figure 1C:
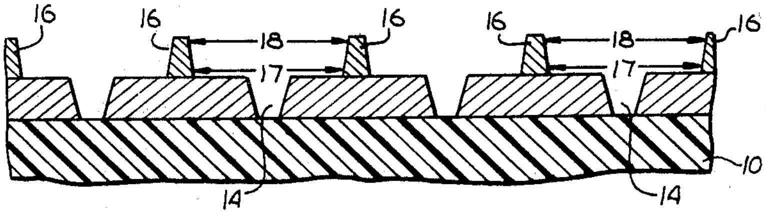
FIG. 1*c* is a diagrammatic representation of the passivating layer that has been finely etched to provide the desired opening configurations.
Figure 1D:
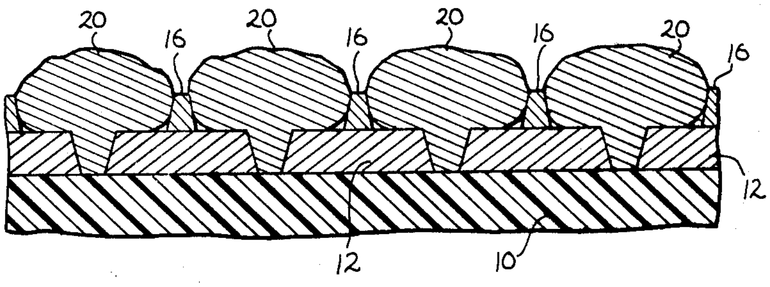
FIG. 1*d* is a diagrammatic representation of the epitaxially grown silicon crystals in the openings.

After openings 14 have been etched into the layer 12, a second oxide or silicate layer 16 is imposed upon the first layer 12, a larger pattern is then aligned and etched through the second layer by the same techniques that were used to etch the first layer. Thus, as shown in FIG. 1*c*, an opening through the second layer 16 has a width 18 near its upper end and narrows to a width 17 at the surface of layer 12 where it meets the upper surface of opening 14. The openings in layers 12 and 16 provide the cavities for the epitaxial growth and are mushroom shaped. It is within the scope of the invention to provide openings having varying configurations and diameters by any other techniques rather than by use of two separate patterns as described. As shown in FIG. 1*c*, there are a number of openings having a larger diameter 18 near their upper ends thereof and being isolated from one another by the formed partitions of the passivating layer 16. The partitions 16 serve two fundamental functions. Firstly, the epitaxial silicon 20 that is grown into the cavities formed by the passivating layers 12 and 16, as shown in FIG. 1*d*, is extremely brittle; therefore it is necessary to have areas of support at fairly close intervals to prevent cracking and disintegration during subsequent operations. Secondly, the top surfaces of the epitaxially grown semiconductor will have a shape resembling the tops of mushrooms and will be surface lapped extremely fast which does not allow adequate control of the lapping operation. The silicon dioxide portions 16 serve as indices during the lapping operation. The portions 16 are much more resistant to lapping than is the silicon and therefore when the top surface of portions 16 are reached in the lapping operation, the rate of lapping continues at a much slower and controllable pace. The silicon crystals 20 that are grown on the exposed silicon wafer 10 may be either N type or P as desired and as shown in FIG. 1*d* have a mushroom-like appearance. For the purposes of illustration, the silicon crystals epitaxially grown are N type and have a resistivity in the range of approximately 1–10 ohm-centimeters. Various methods for performing such epitaxial growth are well known in the art. For example, the utilization of a vapor deposition process making use of the hydrogen reduction of silicon tetrachloride and the halide of the impurity metal which is to be introduced into the silicon. A vehicle gas may be used in the process which would normally be hydrogen.

It is also possible to grow single crystals of silicon having a conductivity type different from that of the substrate. For example, P type silicon can be epitaxially grown on wafer 10 by the known techniques mentioned earlier by passing the vehicle gas through a source of boron or the like.

Further the epitaxial growth could begin with the same conductivity type material as the wafer 10 and at some desired point during the epitaxial growth, the doping material may be changed to provide further growth of a different conductivity type.

Figure 1E:
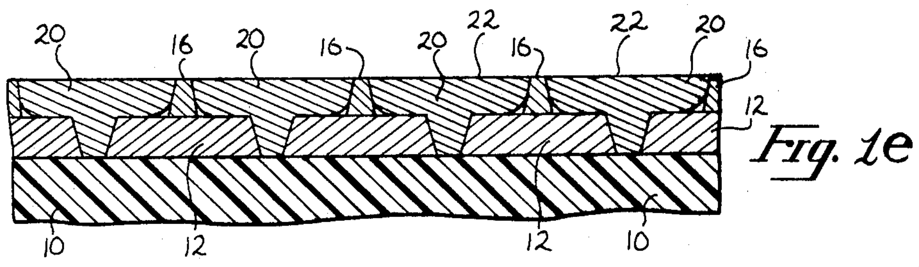
FIG. 1*e* is a diagrammatic representation of epitaxially grown silicon crystals that have been surface lapped.

As depicted in FIG. 1*e*, the mushroom shaped silicon crystals 20 are subsequently lapped until a top surface 22 with the desired finish and flatness is obtained. At this stage there are formed a number of islands of silicon crystals 20 which are partially isolated by sections of passivating layer 16. As previously mentioned, the lapping may be controlled quite closely by virtue of the slow lapping rate obtained because of the resistance to lapping posed by the layer 16.

It is of course within the scope of this invention to provide openings or cavities in the passivating layers which have various configurations other than those previously described as mushroom shaped. This can be accomplished by depositing several oxides or passivating layers and then using subsequent patterns to etch the desired configuration. Although in the present example only two patterns were used to obtain the mushroom configuration, it is conceivable that more patterns could be employed to obtain any other desired "tier-type" configuration. The term "tier-type" as used herein applies to an opening or cavity having specifically defined and intentionally predetermined dimensional variations in the wall configuration of the cavity. These dimensional variations are formed, for example, by varying the diameters of the openings in the various passivating layers that are deposited so that a cross section taken through a cavity would show the wall of the cavity as having a profile with at least two "steps" or "tiers" having varying and given cross-sectional areas. (See FIG. 1*c* through FIG. 5.) The "tier-type" cavities serve as "molds" for providing the shape of the epitaxial growth desired. The advantages served by the "tier-type" configuration of the cavities are more fully dealt with in the descriptions of the various devices formed, utilizing the structure and method of the invention. The height and width of the tiers may be formed to yield the desired device configuration.

Figure 2:
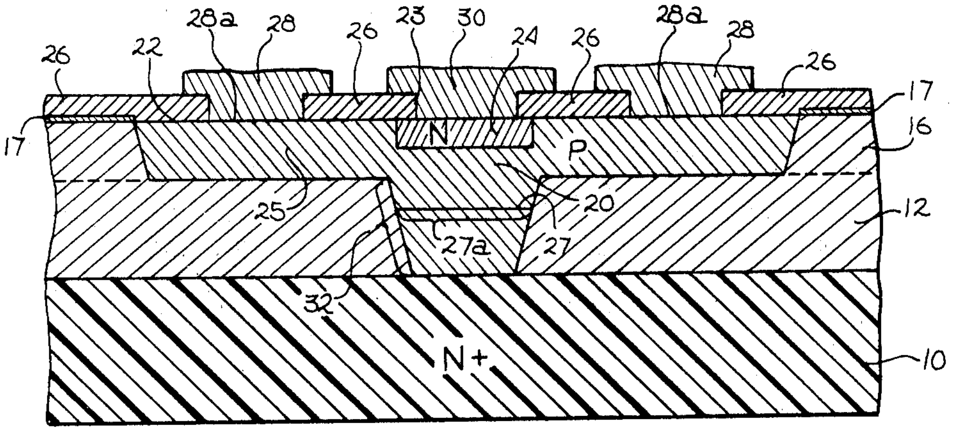
FIG. 2 is a diagrammatic view of a transistor device employing the epitaxially grown silicon crystal.

FIG. 2 depicts one of the single crystal islands 20 shown in FIG. 1*e* with a flat surface 22. The crystal 20 may then be processed into a transistor by first thermally growing an oxide 17 upon the surface 22. The oxide is preferably silicon dioxide. A photoresist layer is then applied to the oxide and a photoresist mask is imposed upon the surface of the photoresist layer. The photoresist is then exposed in the conventional manner and the oxide is etched to provide an opening in oxide layer 17 for a base diffusion. The base diffusion can be accomplished by using the well known technique of diffusing boron trichloride into the previously etched opening and into the area 25 of the single crystal. The diffusion may also proceed and enter into the stem portion 32 of the mushroom 20. The depth of the diffusion into the mushroom shaped crystal will cause the area **27*a* of the junction 27 to vary and thus there is the ability to control the capacitance of the junction 27 by the depth of diffusion into the crystal 20. The smaller the area 27*a* (for example, in the stem region 32) the lower the capacitance. After the base diffusion has been achieved, and another oxide layer 26 is grown over the exposed silicon surface and another photoresist operation and etching is carried out as previously described to define an opening 23. The emitter 24 is then diffused into the previously formed base area 25 in the area defined by opening 23. Emitter 24 may be diffused by the conventional techniques of diffusing phosphorus into the base under controlled conditions. An opening 28**(*a*) is provided in the oxide layer 26 by known techniques previously described. Metal portions 28 and 30 are deposited in the openings 23 and 28(*a*) to provide contacts for the base and for the emitter. The metal contacts may be aluminum which are evaporated and vapor deposited by conventional techniques. The active area of the transistor disclosed is only that area beneath the emitter. The rest of the base area then acts as a parasitic capacitor. Thus, the functional area of the base-collector junction 27 can be controlled by varying the dimension **27*a*** to produce the desired junction capacitance.

By the method described above for epitaxially growing a single crystal of silicon, it is also possible to increase the breakdown voltage and to provide higher current handling capability by controlling the resistivity of the silicon in the single crystal growth. The current handling capability is increased by controlling the resistivity of deposited silicon as required and the cutoff frequency of transistor may be likewise improved.

When the junctions of the device formed are reverse biased, a depletion region is formed which will shift either up or down, depending on the resistivities of the materials on either side of the junction. For example, in FIG. 3 a semiconductor wafer 40 of P+ conductivity is provided with an epitaxially grown mushroom 42 of N− conductivity. The depletion region in this particular configuration will proceed up the stem 44 since the junction will move in the direction of high resistivity. (The N− material having a higher resistivity than the P+ material.) The dotted line 46 represents a typical portion of the top surface of the depletion region which has moved up the stem due to the known depletion effect caused by the reverse biasing. The volume of the depletion region affects the voltage-capacitance characteristics of the device. Thus, it is possible to obtain a desired voltage-capacitance relationship by varying the volume of the depletion region by controlling the reverse bias voltage.

Figure 3:
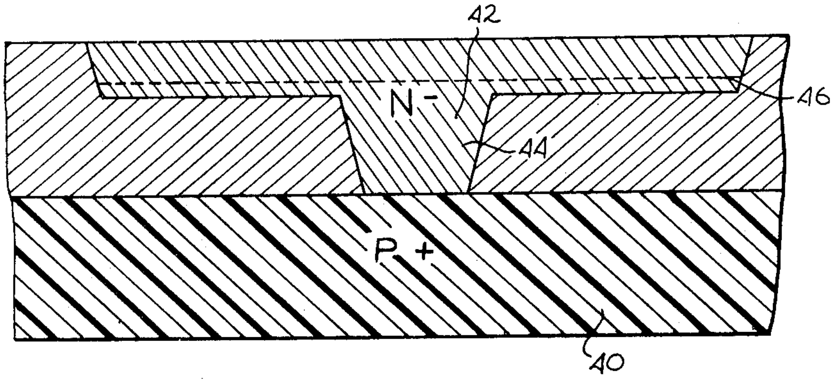
FIG. 3 is a diagrammatic view of another embodiment of the present invention.
Figure 4:
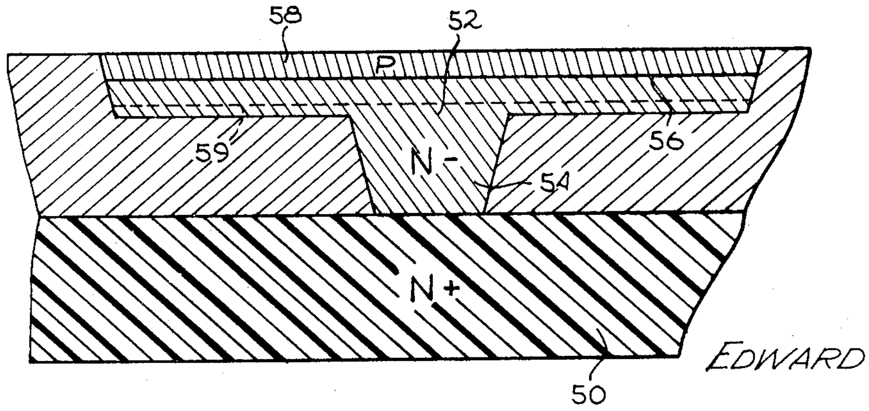
FIG. 4 is a diagrammatic view of still another embodiment of the present invention.

FIG. 4 depicts another embodiment in which an N+ silicon wafer 50 is provided with an epitaxially grown mushroom 52 of the N− type material. By known methods previously described, a diffusion step is utilized to provide a P type area 58 and a junction 56. By reverse biasing the junction 56, a depletion region is formed which moves down towards the stem where the N− material is present. The dotted line 59 represents a typical position of the lower surface of the depletion region. As described earlier, the depletion effect causes the surface of the depletion region to move in the direction toward the high resistivity which in this embodiment is the N− material. The embodiments of FIGS. 3 and 4 illustrate, by way of example how the choice of materials and reverse biasing voltage enable the depletion region volume to be varied and controlled to obtain the desired voltage-capacitance properties required to suit particular application requirements.

Figure 7:
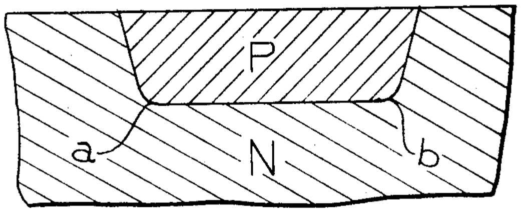
FIG. 7 is a diagrammatic representation showing the curvature at the edges of a diffused junction; and, FIG. 8 is a graph of capacitance vs. voltage in which devices made by the present invention are compared with similar devices not made in accordance with the teachings of the present invention.

Since the base-collector junctions defined by the above processes are sharply defined (no curved edges or corners) they exhibit breakdown voltages that have not been heretofore attained by normal diffusion methods. It is believed that the higher breakdown voltage characteristics are obtained because the curved or rounded portions *a* and *b* observed in the prior art diffused junction (shown in FIG. 7) are completely eliminated in the present construction.

Figure 5:
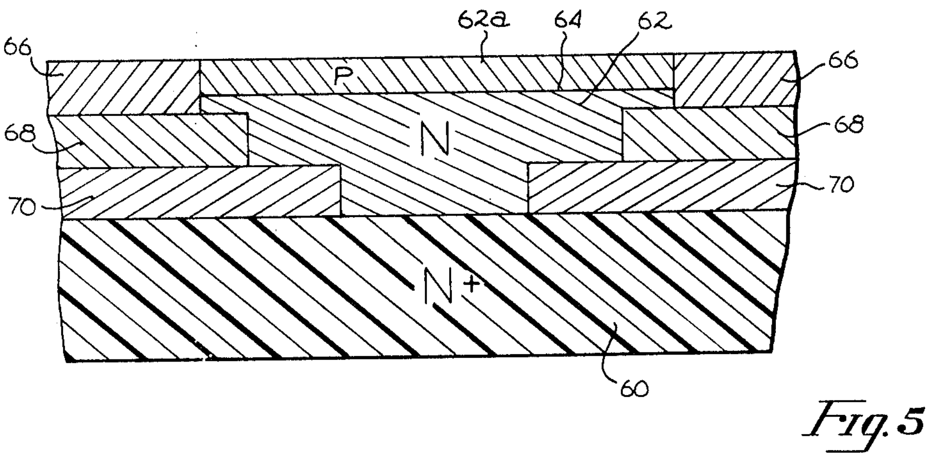
FIG. 5 is a diagrammatic view of yet another embodiment of the present invention which may be used for a frequency multiplier or function generator.

FIG. 5 illustrates another embodiment which makes use of three oxide layers which have been formed in a "tier-type" relationship. This embodiment is illustrative of the various forms which may be utilized in the present invention. By way of example, there is shown an N+ wafer 60 and an epitaxially grown island 62 of N material. One or more diffusions may then be performed by normal techniques to any depth desired. FIG. 5 shows P type layer **62*a*. A junction such as junction 64 is formed and may be reverse biased to drive the depletion region in the direction desired (which in the present embodiment would be toward the N portion of the island 62). By changing the resistivity in growing the epitaxially formed portions of the device shown in FIG. 5; and/or by the selection of the type of substrate and epitaxial materials the junctions may be formed having desired layers which will produce electrical characteristics useful in such devices as frequency multipliers or function generators. Depending on the number of tiers and their configuration, such as, 66, 68 and 70, the form of the epitaxially grown crystal may be varied to obtain almost any desired configuration and to produce the electrical characteristics and properties required. It should also be understood that the height and width of the tiers such as 66, 68 and 70 may be varied to aid in the obtaining of the desired shape of the crystal 62**. As previously mentioned, it is possible to vary the conductivity and/or resistivity at any convenient step of the epitaxial growth process. This provides tremendous flexibility for designing devices of given characteristics and properties, especially when combined with the variable layers which may be achieved by the selection of the height and width dimensions for the various "tier-type" oxide layers described. The conductivity and resistivity changes may be made to correspond to the various layers defined by the individual tiers, or at any other intermediate position.

Figure 6:
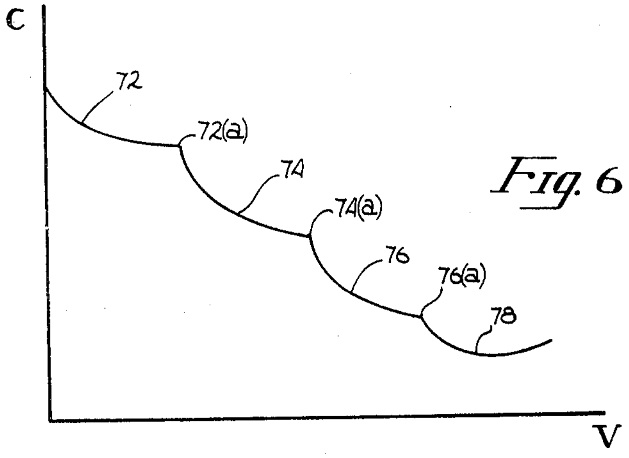
FIG. 6 is a graph illustrating a typical plot of capacitance vs. voltage for a device having an embodiment shown in FIG. 5.

FIG. 6 illustrates a typical capacitance vs. voltage plot of a device similar to that illustrated in FIG. 5. The curve will have break points 72(*a*), 74(*a*) and 76(*a*) showing definite changes and discontinuations in the plotted parameters. The plotted curve is made up of segments 72, 74, 76 and 78, for example, which may be utilized by those skilled in the art to define parameters for function generators and/or frequency multipliers.

Figure 8:
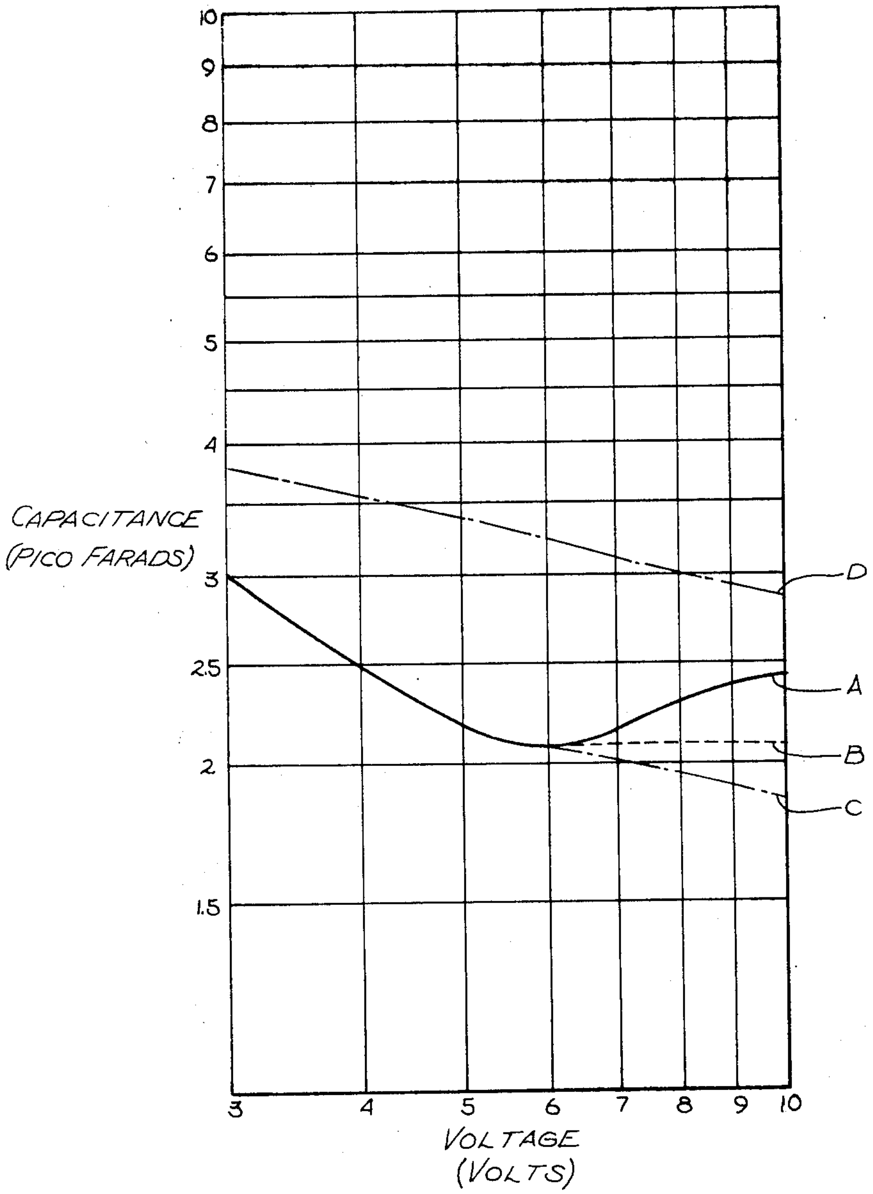

FIG. 8 is a plot on a log-log scale of capacitance vs. voltage showing the generally lower junction capacitance characteristics which may be obtained by utilizing the present invention. The graph shows a plot of capacitance in picofarads versus voltage in volts. The dotted line D represents the characteristics of a device utilizing the same materials and process condition as the device whose characteristics are shown by the solid line except that the latter device employed the method described in the present invention (mushroom configuration). It should be noted that the capacitance characteristics are remarkably lower for the device of the present invention than for the device not utilizing the "mushroom configuration." For example at the 6 volt point the capacitance of the mushroom device is about 2.1 picofarads while the "conventional" device exhibits a capacitance of 3.3 picofarads, approximately 57% higher than the mushroom device. Further, by the methods previously described, mushroom devices have been fabricated where the capacitance increases as a function of voltage (as shown by curve A). Also, using the methods described, curves such as B and C have also been obtained where the capacitance has leveled off or decreased as a function of voltage. The ability to change the capacitance-voltage characteristics as shown in FIG. 8 is extremely useful in function generator and frequency multiplier applications and the device may be tailored to meet the desired application requirements.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A method for providing single crystal semiconductor devices comprising the steps of:

(a) providing a wafer of single crystal semiconductor, said wafer having a surface;

(b) providing at least one passivating layer over said surface of said wafer;

(c) forming at least one opening of a predetermined "tier-type" configuration in said passivating layer to expose a portion of said surface of said wafer, said tier-type" configuration comprising an opening in said passivating layer having a profile of at least two discrete and different cross-sectional dimensions; and (d) epitaxially growing a single crystal semi-conductive material in the opening formed by said "tier-type" configuration until it overflows said opening.

2. The method of claim 1 in which said "tier-type" configuration is formed by depositing at least two passivating layers of given thickness and forming openings of different given dimensions in each of said layers.

3. The method of claim 1 in which said wafer and said epitaxially grown semiconductive material is silicon.

4. The method of claim 3 in which said wafer and said epitaxially grown semiconductive materials are of the same conductivity type and a device junction is formed by diffusion in said epitaxially grown material, said diffusion producing an area of conductivity type different from said epitaxially grown material.

5. The method of claim 3 in which said wafer and said epitaxially grown semiconductive material are of different conductivity types thereby forming a device junction at said surface of said wafer.

6. The method of claim 1 in which the resistivity of the epitaxially formed crystal material is varied during the epitaxial growth.

7. The method of claim 1 in which said passivating layer is silicon dioxide.

8. The method of claim 1 in which said opening is formed in said passivating layer by chemical etching.

9. The method of claim 1 in which the epitaxially grown semiconductive material is surfaced lapped until a given surface finish and flatness is obtained.

10. A method for producing single crystal silicon in a semiconductor device comprising the steps of:

(a) providing a wafer of single crystal silicon, said wafer having a surface;

(b) providing a layer of silicon oxide of a given thickness over said surface of said wafer;

(c) forming at least one opening of a predetermined area in said oxide layer to expose a portion of said surface of said wafer;

(d) providing a second oxide layer of given thickness adjacent said first oxide layer;

(e) forming at least one opening of a predetermined area in said oxide layer, said opening in the second oxide layer being positioned adjacent said opening in said first oxide layer and said opening in said second layer being larger than said opening in the first oxide layer thereby forming a "tier--type" configuration; and (f) epitaxially growing single crystal silicon in the openings formed by said "tier-type" configuration until it overflows said holes forming a mushroom shaped crystal.

11. The method of claim 10 in which said openings are opened in said oxide layers by etching.

12. The method of claim 10 in which said silicon wafer and said epitaxially grown silicon are of the same conductivity type and a device junction is formed by diffusion in said epitaxially grown silicon, said diffusion producing an area of conductivity type different from said epitaxially grown material.

13. The method of claim 10 in which said silicon wafer and said epitaxially grown silicon are of a different conductivity type thereby forming a junction device.

14. The method of claim 10 in which the resistivity of the epitaxially formed crystal material is varied during the epitaxial growth.

15. The method claim 10 in which the epitaxially grown silicon is surfaced lapped until a given surface finish and flatness is obtained.

References Cited

UNITED STATES PATENTS

| | | | |
|---|---|---|---|
| 3,200,311 | 8/1965 | Thomas et al. | 317—234 |
| 3,226,268 | 12/1965 | Bernard | 148—33.2 |
| 3,243,323 | 3/1966 | Corrigan et al. | 148—175 |
| 3,265,542 | 8/1966 | Hirshon | 148—175 |
| 3,387,189 | 6/1968 | Anderson et al. | 317—234 |
| 2,989,650 | 6/1961 | Doucette et al. | 307—88 |
| 2,993,155 | 7/1961 | Götzberger | 317—242 |
| 3,171,762 | 3/1965 | Rutz | 148—175 |
| 3,192,083 | 6/1965 | Sirtl | 148—175 |
| 3,403,439 | 10/1968 | Bailey | 29—578 |
| 3,432,920 | 3/1969 | Rosenzweig | 29—578 |
| 3,458,369 | 7/1969 | Marinace | 148—175 |

OTHER REFERENCES

Yu, H. N.: "Fabrication of Planar Arrays of Semiconductor Chips by Epitaxial Growth," IBM Tech. Discl. Bull., vol. 7, No. 11, April 1965, p. 1104.

L. DEWAYNE RUTLEDGE, Primary Examiner

W. G. SABA, Assistant Examiner

U.S. Cl. X.R.

29—578; 117—106, 212; 148—1.5; 156—17; 317—235